UNITED STATES PATENT OFFICE.

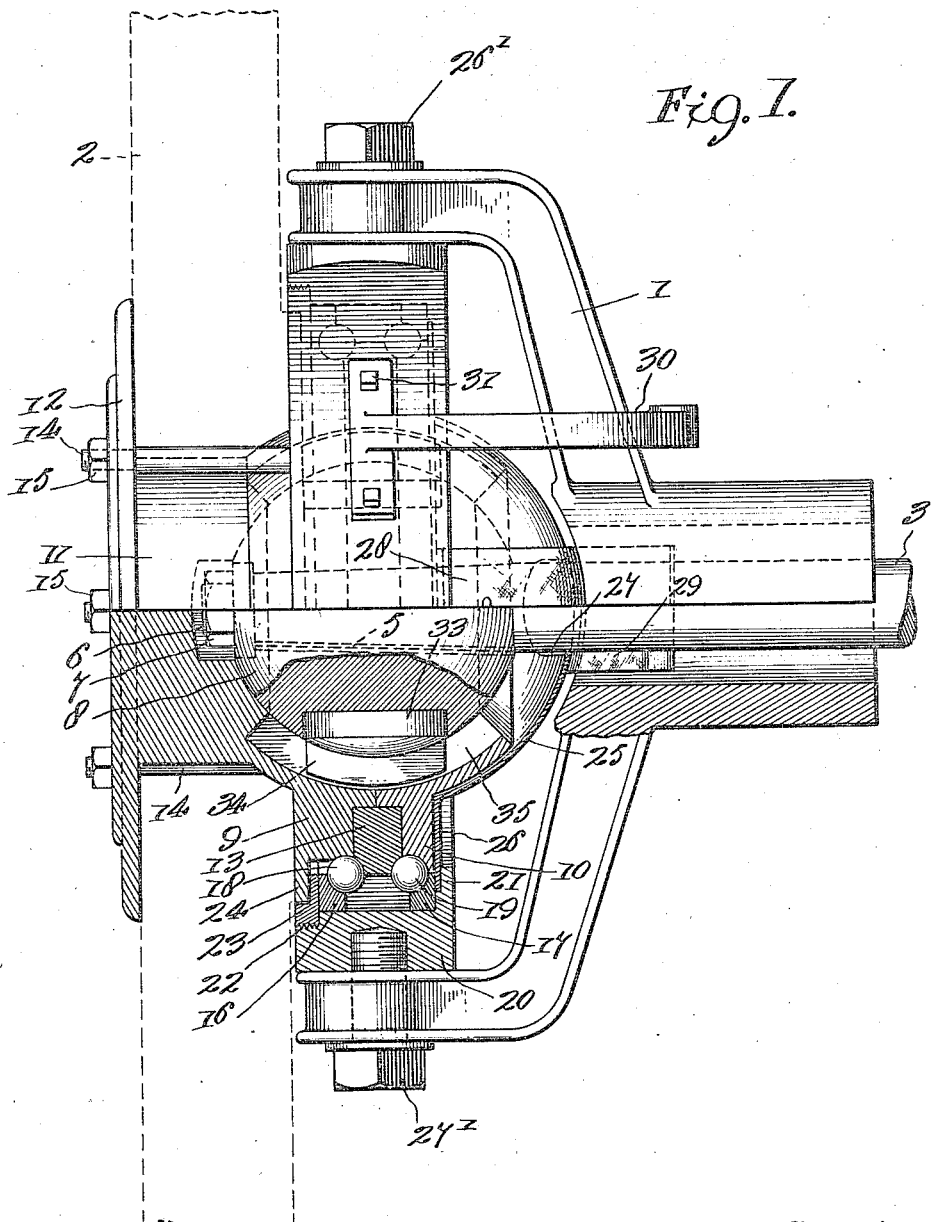

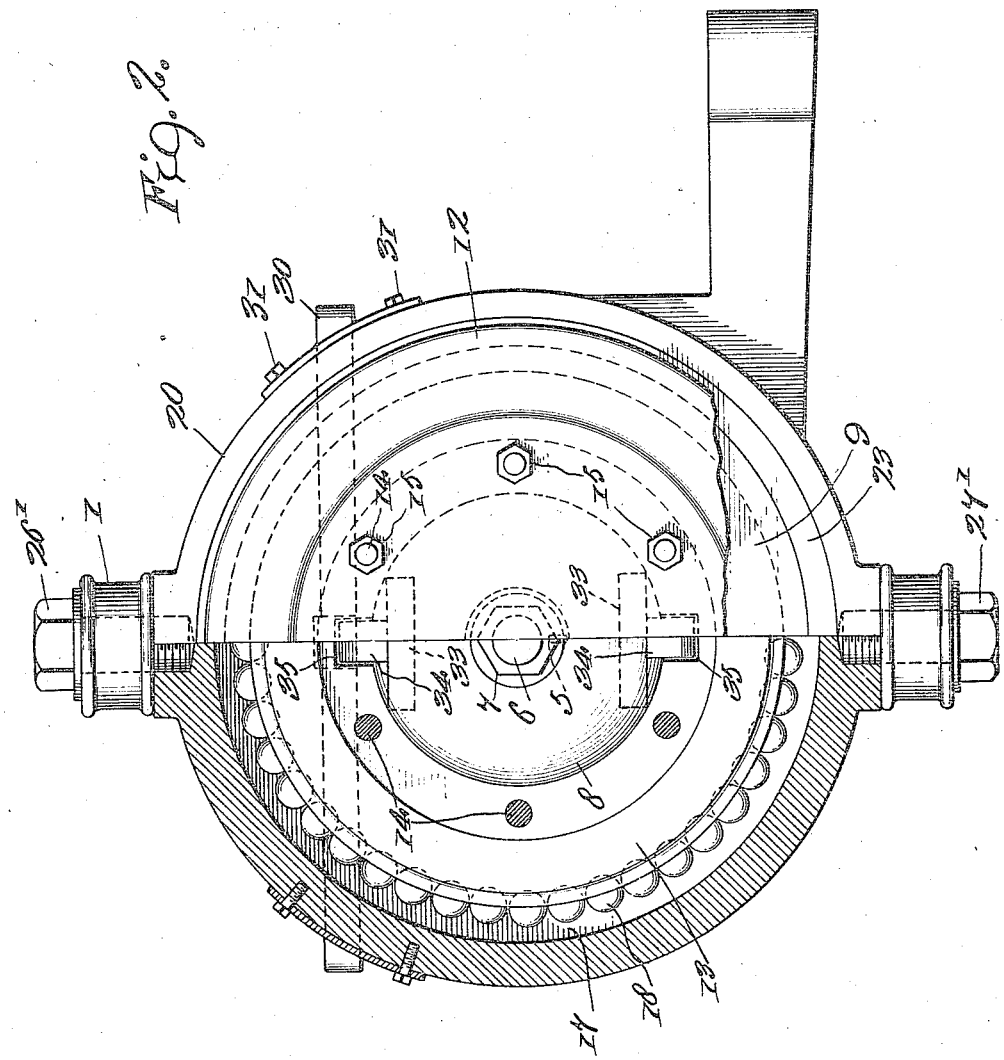

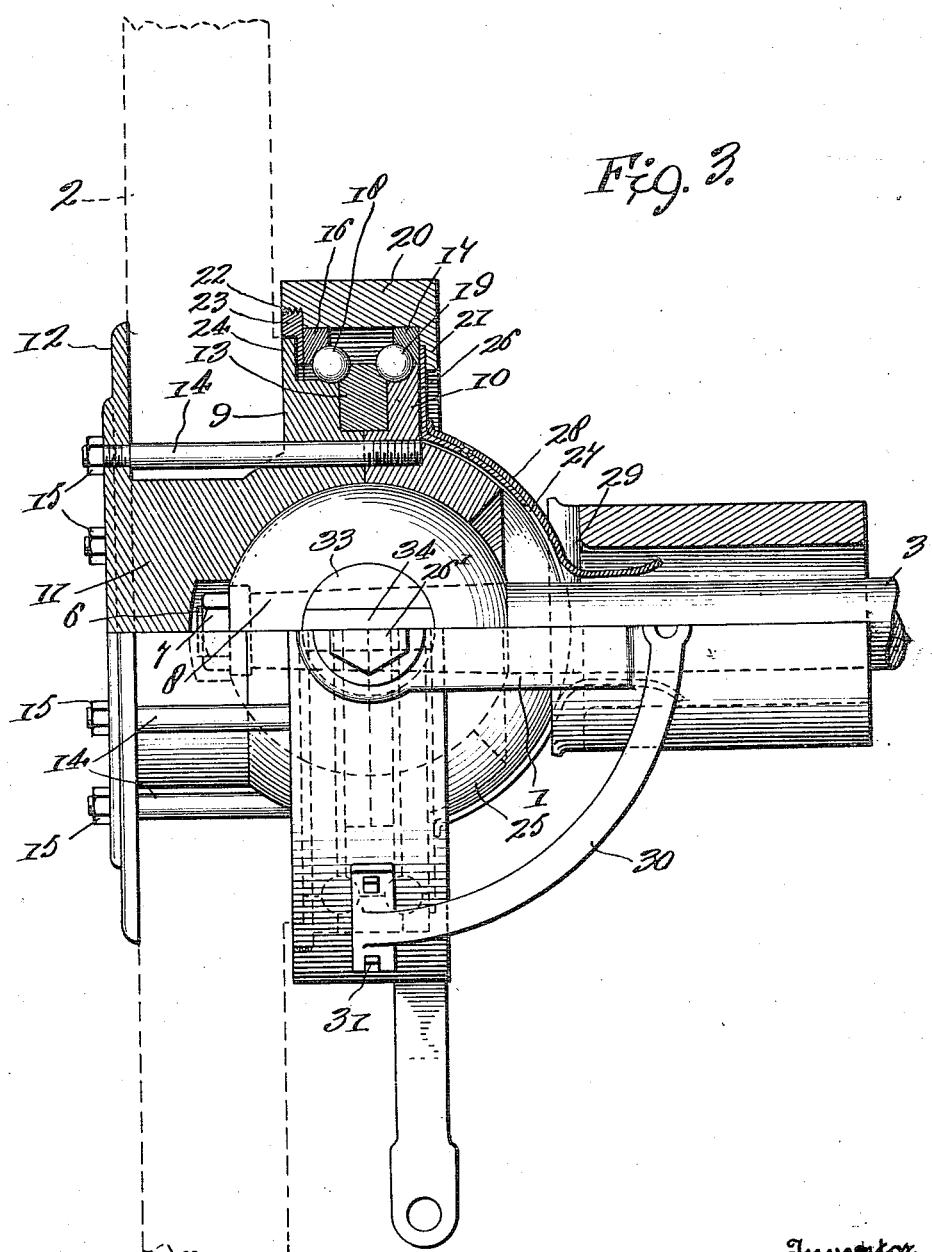

ORRA O. HOOTMAN, OF BIGPRAIRIE, OHIO.

UNIVERSAL DRIVE FOR VEHICLES.

1,284,342.   Specification of Letters Patent.   Patented Nov. 12, 1918.

Application filed May 14, 1918. Serial No. 234,366.

*To all whom it may concern:*

Be it known that I, ORRA O. HOOTMAN, a citizen of the United States, residing at Bigprairie, in the county of Holmes and State of Ohio, have invented certain new and useful Improvements in Universal Drives for Vehicles; and I do hereby declare the following to be a full, clear, and exact description of the invention, such as will enable others skilled in the art to which it appertains to make and use the same.

The present invention relates to improvements in universal drives for vehicles, and consists more particularly in certain hereinafter described improvements over my prior Patent No. 1,144,845, granted June 29, 1915, and similarly entitled.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a fragmentary front elevational view, partly in section, of a universal drive for vehicles as constructed in accordance with the present invention and applied to the front or rear wheel of a vehicle, the wheel being shown by fragmentary broken lines.

Fig. 2 is a side elevational view partly in section, and with parts broken away, of the same; and Fig. 3 is a plan view of the same, partly in section and with parts broken away.

Referring more particularly to the drawings, wherein one embodiment of the invention is illustrated, 1 designates the forks usually found at the front of the chassis frames of automobiles and similar vehicles as now constructed, and in which the front wheels of the vehicle, here indicated at 2, are mounted to turn horizontally for purposes of steering. In accordance with the present invention, the steering wheels 2 of the vehicles are arranged to be connected to the engine or other suitable source of power carried by the vehicle, and driven therefrom; and to this end the forward, or both forward and rear ends of the chassis frame of the vehicle is or are provided with a drive shaft 3, connected in any suitable manner to the vehicle engine, and, as indicated in Figs. 1 and 3, the drive shaft 3 is a floating shaft supported centrally by the differential and at its ends by the balls 8.

As disclosed to advantage in Fig. 1, the drive shaft 3 is tapered or keywayed, or otherwise formed as indicated at 5, and constructed with reduced ends 6 threaded for the reception of a nut 7. On each tapered end 5 of the drive shaft 3 is mounted a ball 8, secured thereon by the nut 7 and keyed or otherwise secured to said shaft; and ball 8 constitutes one element of a universal joint and is mounted in a socket in the usual manner.

The socket for the universal ball 8 consists, in this instance, preferably of two coöperating annular members 9 and 10 fitted together and having spherical interior walls arranged to have a universal movement over the surface of said ball 8. In accordance with my present invention I preferably extend the central portion of the outer member 9 in the manner more particularly shown in Figs. 1 and 2, so that the same may provide a hub 11 on which the wheel 2 may be built or supported.

A plate 12 made a part of or fitted over the exterior of the hub extends against the wheel 2; this plate 12 being held in place by the bolts 14 or other means.

At 15 are shown nuts threaded on the bolts 14 and taking against the plate 12. These bolts 14, as shown in Fig. 3, pass through the annular member 9 and are threaded into the companion annular member 10, whereby these two members and the wheel are rigidly held together. Along their interior meeting edges these annular members 9 and 10 are recessed to receive a ring 13, preferably of rectangular cross section and being beveled off at its outer edges to coöperate with the two cones 16 and 17, between which and the ring 13 are confined two annular series of ball bearings 18 and 19.

An annulus or casing 20 fits over the two cones 16 and 17 and confines the various parts in place. This annulus 20 has threaded sockets to receive the pivot pins 26' and 27' which support the various parts in the forks 1 for the pivotal steering movement. A flange 21 is provided on the inner side of the annulus 20 which extends inwardly and is adapted to confine in place the cone 17. The outer side of the annulus 20 is threaded, as indicated at 22, to receive a threaded ring 23 which is removably held on said annulus and bears on one side against the cone 16, and on its opposite side there is a flange 24 extending from the annular member 9, to prevent dust from entering; said ring 23 is preferably cut away to receive said flange 24 in order that the parts may be compactly assembled so as to avoid the entry of dirt and gravel.

The dust guard 25 fits about the interior side of the annular member 10 with clearance and extends inwardly to the shaft 3. This dust guard 25 has an extension 26 which fits between the cone 17 and the flange 21, which confines the same in place.

As shown more particularly in Fig. 3, there is a slot 27 provided in this dust guard 25 in order to permit the swinging steering movement of the wheel, and in this instance I prefer to close this slot by two strips of leather 28 secured in any suitable manner to the dust guard and extending along the axle 3. These strips of leather 28 serve to effectively exclude the dust which would otherwise gain access to the interior parts through the slot 27.

I also preferably provide a circular steering arm 30 which, as shown in Figs. 1 and 2, extends about the forks 1 from front to rear and is secured as by bolts 31 to, or if desirable may form a part of the annulus or casing 20. This steering arm 30 is connected to the steering rod in any suitable manner.

The ball 8 of the universal joint is provided with two or more circular recesses in each of which is revolubly mounted a circular block 33, constructed spherical at the top thereof to conform to the curvature of the ball 8, and formed, substantially centrally thereof with a curved key 34. The key 34 slidingly fits in a key-way 35, formed in the socket members 9 and 10, as shown in Figs. 1 and 2, and coöperates therewith to form the driving element for imparting to the wheel 2 rotary motion from the shaft 3.

In practice, assuming the block 33 and associated key 34 to be in the position shown in Fig. 1, and the vehicle to be turned to the right or left, the steering mechanism would be operated in the usual manner to revolve the wheel 2 about the vertical pivots 26' and 27' in the desired direction. With such turning of the wheel 2, the socket members 9 and 10, being rigidly connected to the same, will in like manner turn upon the universal ball 8 and the key-way 35 will be swung in a horizontal plane. The horizontal movement of the key-way 35 is permitted by means of the rotary block 33 of which the key 34 is a projection or part and the block 33 revolves freely in its recess in accordance with the movement of the key 34 as compelled by the horizontal movement of the key-way 35 in steering the vehicle.

As the wheel 2 rotates the key 34 will be driven to a horizontal position, at an angle of ninety degrees from the position shown in Figs. 1 and 2, in which position movement of the wheels 2 about the steering journals to turn the vehicle in either direction, will operate to traverse the key 34 laterally in the key-way 35. Such oscillating movement of the key 34 in the key-way 35, and the rotary movement of the block 33 in the recess of the ball 8, will be alternately acomplished as the wheel rotates and the key 34 moves into vertical position, in alinement with the trunnions 26 and 27, and into a horizontal position between said trunnions.

It is obvious that those skilled in the art may vary the details of construction and arrangements of parts without departing from the spirit of my invention, and therefore I do not wish to be limited to such features except as may be required by the claims.

I claim:

1. In combination an axle, forks, a drive shaft, a universal ball on said drive shaft, a socket member composed of a pair of annular members fitted together, drive means between said ball and socket member, a wheel turning with said socket member, a ring fitted between said socket members and having ball bearing surfaces, an annulus, cones fitted in said annulus, ball bearings between said cones and surfaces on said ring, a flange on said annulus for fitting about one of said cones, a removable ring at the opposite end of said annulus for confining the other of said cones, and means on said socket member bearing against said last named ring to hold the same in place, substantially as described.

2. A device of the character described including a vehicle axle, forks supported by said axle, a drive shaft journaled in said axle, a ball on said drive shaft, a socket movably mounted on said ball, drive means arranged between said ball and socket, a ring carried by said socket and having beveled outer edges, an annulus surrounding said socket and ring, cones fitted within said annulus, circular series of ball bearings arranged between the beveled edges of said ring and said cones, means extending inwardly from said annulus to confine one of the cones in place, a removable ring fitted at the other side in the annulus for confining the other cone in place, a flange extending from said socket and overlapping said last-named ring, means whereby the annulus may be rotatably supported in said forks, and a wheel carried by said socket, substantially as described.

3. In a device of the character described, the combination of an axle, steering forks carried on said axle, a drive shaft journaled in said axle, a universal ball fastened to said drive shaft, a socket movably fitted on said ball, said socket being made up of inner and outer annular members, drive means arranged between said ball and socket, a hub formed of an extension of said outer annular member, a wheel mounted on said hub, a plate on the outside of said wheel, fastening means passing through said plate and through said annular members, said socket being provided with a recess, a ring fitted in the recess in said socket and having beveled outer edges, an annulus fitting about said socket and ring, cones carried within said annulus, a double series of ball bearings arranged between the beveled edges of said ring and said cones, means for holding the inner cone in place, said means carried on and extending inwardly from said annulus, removable means at the other side of the annulus for confining the outer cone in place, means on the outer annular member of the socket for fitting against said last named means to exclude dust from the bearings, and pivots carried by the forks and engaging with said annulus to support same, substantially as described.

4. In combination, a vehicle axle having the usual forks, a drive shaft journaled in said axle, a universal ball made fast on said shaft, a socket having a universal movement about said ball, said socket being composed of inner and outer annular members, drive means arranged between said ball and socket, a wheel carried by the outer annular member, means to secure said annular members together, a ring carried by said annular members and having beveled edges, an annulus extending about said socket and ring, cones fitted within said annulus, ball bearings arranged between the beveled edges of said ring and said cones, a flange projecting inwardly from said annulus to confine the inner cone in place, a removable ring fitted in the other side of the annulus for holding the outer cone in place, a flange on the outer annular member having an overlapping engagement with said last named ring, a dust guard extending about the inner annular member of the socket and having a slot to receive the drive shaft, strips of flexible material secured to said dust guard and fitting over the slot at opposite sides of said drive shaft, the ends of the two strips being carried for a distance within said axle, an extension on said dust guard fitting within the flange carried by said annulus, and pivots for rotatably supporting the annulus in said forks, substantially as described.

5. In combination, a vehicle axle having the usual steering forks, a drive shaft journaled in said axle, a universal ball fixed to said shaft, a socket movably mounted on said ball and composed of inner and outer annular members, drive means between said ball and socket, a hub forming an extension of the outer annular member, a wheel mounted on said hub, a plate on the outside of the wheel, fastening means passing through the plate and through said annular members, a ring carried by said annular members, an annulus passing about said socket and ring, cones within said annulus, ball bearings arranged between said ring and cones, a flange extending inwardly from said annulus and engaging the inner cone, a threaded ring at the outer side of the annulus, a flange on the outer annular member having an overlapping engagement with said threaded ring, said annulus having threaded sockets, threaded pivot pins passing through said forks and engaging said threaded sockets, a curved steering arm attached to said annulus, a dust guard extending about the inner annular member and having a slot for receiving said drive shaft, and strips of flexible material for concealing the sides of the slot, substantially as described.

In testimony whereof I affix my signature.

ORRA O. HOOTMAN.